United States Patent
Parthasarathy

(10) Patent No.: US 10,521,116 B2
(45) Date of Patent: Dec. 31, 2019

(54) SYSTEM AND METHOD FOR MANAGING OBJECT STORE

(71) Applicant: Nutanix, Inc., San Jose, CA (US)

(72) Inventor: Ranjan Parthasarathy, Milpitas, CA (US)

(73) Assignee: NUTANIX, INC., San Jose, CA (US)

(*) Notice: Subject to any disclaimer, the term of this patent is extended or adjusted under 35 U.S.C. 154(b) by 39 days.

(21) Appl. No.: 15/877,948

(22) Filed: Jan. 23, 2018

(65) Prior Publication Data
US 2019/0227713 A1    Jul. 25, 2019

(51) Int. Cl.
G06F 12/00    (2006.01)
G06F 3/06    (2006.01)
G06F 9/455    (2018.01)

(52) U.S. Cl.
CPC ............ G06F 3/0607 (2013.01); G06F 3/065 (2013.01); G06F 3/067 (2013.01); G06F 3/0667 (2013.01); G06F 9/45558 (2013.01); G06F 12/00 (2013.01); *G06F 2212/657* (2013.01)

(58) Field of Classification Search
CPC ..................................................... G06F 12/00
USPC ........................................................ 711/162
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |
| 9,747,287 | B1* | 8/2017 | Bhardwaj ............ G06F 3/0604 |
| 9,772,866 | B1 | 9/2017 | Aron et al. |
| 2007/0028056 | A1* | 2/2007 | Harris .................... G06F 9/467 711/150 |
| 2015/0120687 | A1* | 4/2015 | Bhattacharjee ..... G06F 16/2343 707/704 |
| 2015/0178364 | A1* | 6/2015 | Dobre .................... G06F 16/27 707/620 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Gautam Sain
(74) *Attorney, Agent, or Firm* — Foley & Lardner LLP

(57) ABSTRACT

A system and method include receiving, by an object store virtual machine of a virtual object storage system, a user request for updating an element of an object store. The user request includes a first compare and swap value. The system and method also include updating the first compare and swap value from the second user request for obtaining an updated compare and swap value, comparing the updated compare and swap value with a current compare and swap value of the element, and updating the element upon determining that the updated compare and swap value is greater than the current swap and compare value. Updating the element comprises one of creating a new version of the element and overwriting a previous version of the element. The system and method further include replacing the current compare and swap value with the updated compare and swap value.

19 Claims, 4 Drawing Sheets

(56) References Cited

OTHER PUBLICATIONS

Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
Amazon AWS-Cloud Computing Services, 2018, 12 pages, https://aws.amazon.com/, retrieved Apr. 26, 2018.
Microsoft Azure, "Introduction to object storage in Azure," Mar. 27, 2018, Table of Contents and Introduction only;, https://docs.microsoft.com/en-us/azure/storage/blobs/storage-blobs-introduction, retrieved Apr. 26, 2018.

\* cited by examiner

SYSTEM AND METHOD FOR MANAGING OBJECT STORE

BACKGROUND

The following description is provided to assist the understanding of the reader. None of the information provided or references cited is admitted to be prior art.

Object storage, also referred to as object-based storage, is now widely used in a variety of applications. Object storage is a mechanism that stores data as discrete units, called objects. Object storage provides several advantages over more conventional storage mechanisms such as block storage or file storage in which data is stored as files and nested within folders. Object storage is scalable, cheaper to maintain, and easy to use and access. However, present day object storage has limitations due to their configuration and the way they operate.

SUMMARY

In accordance with at least some aspects of the present disclosure, a method is disclosed. The method includes receiving a second user request from a user for updating an element of an object store. The second user request includes a first compare and swap value. The method also includes updating, by the object store virtual machine, the first compare and swap value from the second user request for obtaining an updated compare and swap value, comparing, by the object store virtual machine, the updated compare and swap value with a current compare and swap value of the element, and updating, by the object store virtual machine, the element upon determining that the updated compare and swap value is greater than the current swap and compare value. Updating the element includes one of creating a new version of the element and overwriting a previous version of the element. The method further includes replacing, by the object store virtual machine, the current compare and swap value with the updated compare and swap value.

In accordance with some other aspects of the present disclosure, a system is disclosed. The system includes a virtual object storage system for managing an object store. The virtual object storage system includes a database configured to store the object store and current compare and swap values associated with the object store and an object store virtual machine having a processing unit. The processing unit is configured to receive a user request from a user for updating an element of the object store. The user request includes a first compare and swap value. The processing unit is also configured to update the first compare and swap value from the user request to obtain an updated compare and swap value, compare the updated compare and swap value with a current compare and swap value of the element, and update the element upon determining that the updated compare and swap value is greater than the current swap and compare value. Updating the element includes one of creating a new version of the element and overwriting a previous version of the element. The processing unit is further configured to replace the current compare and swap value with the updated compare and swap value.

In accordance with some other aspects of the present disclosure, a non-transitory computer readable media is disclosed. The non-transitory computer readable media has computer-executable instructions embodied thereon that, when executed by a processor of a virtual object storage system, cause an object store virtual machine of the virtual object storage system to perform a process including receiving a user request from a user for updating an element of an object store. The user request includes a first compare and swap value. The process also includes updating the first compare and swap value from the user request for obtaining an updated compare and swap value, comparing the updated compare and swap value with a current compare and swap value of the element, and updating the element upon determining that the updated compare and swap value is greater than the current swap and compare value. Updating the element comprises one of creating a new version of the element and overwriting a previous version of the element. The process also includes replacing the current compare and swap value with the updated compare and swap value.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
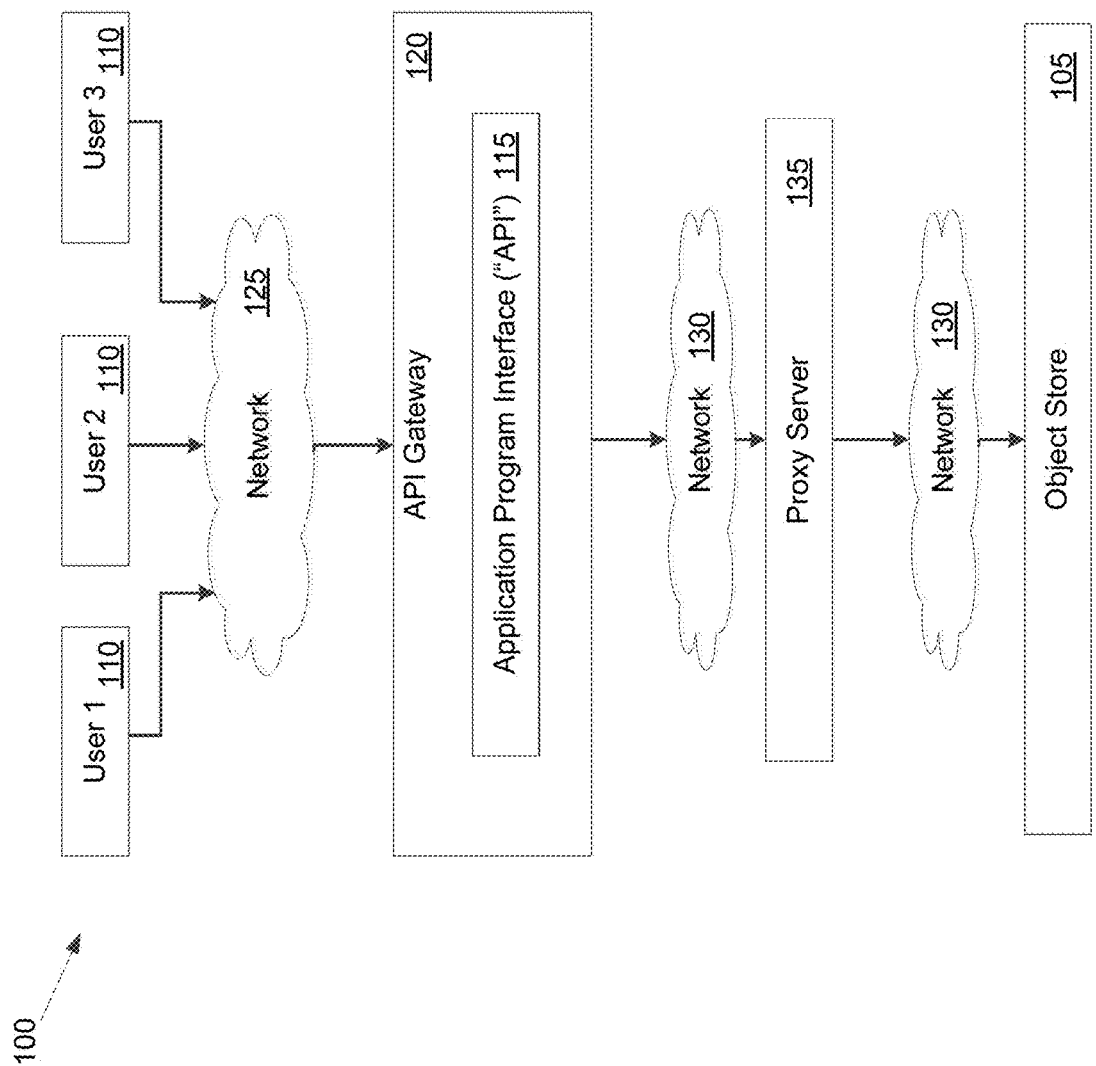
FIG. 1 is a block diagram of an object store system having an object store, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to the management of an object store. The object store may be configured as a virtual object storage system having one or more host machines running one or more virtual machines concurrently. The one or more virtual machines utilize the hardware resources of the underlying one or more host machines to receive user requests, read and write to the object store in response to the user requests, and return information back to the users. As discussed in greater detail below, users may access the object store via an application programming interface ("API"). Further, in some embodiments, at least portions of the object store may be configured to be accessed by multiple users. For example, at least portions of the object store may be configured for "public" use. In such cases, multiple users may read, as well as write to or modify the object store simultaneously. When multiple users attempt to write to, or in other words, update the object store simultaneously, a "collision" condition occurs.

Specifically, the object store may be configured as a plurality of buckets with each bucket having one or more objects. When configured for "public" use, each of the plurality of buckets and the objects therein may be read and updated by multiple users. Thus, a "collision" condition occurs when multiple users attempt to update the same bucket or the same object simultaneously (or substantially simultaneously). In such cases, the updates requested by one user are accepted and the updates requested by the other users are rejected to resolve the collision condition. However, a mechanism is needed to determine which user request to accept and which user requests to reject. Conventional mechanisms use timestamps or headers in the user requests. For example, when using timestamps, a timestamp is included with every user request. When the object store receives two user requests to update the same bucket or object, the object store accepts the user request with an earlier timestamp and rejects the user request with a later timestamp, or vice-versa. Similarly, with conventional mechanisms that use headers, a specific block of information or header is inserted into each user request. Based upon the header information, the object store decides which user request to accept and which user requests to reject. However, these conventional mechanisms have several disadvantages.

For example, the timestamp or header information is frequently filtered out by components (e.g., proxy servers) that route the user requests from a user device to the object store. Specifically and as discussed in greater detail below, a proxy server may be used to route user requests between the users and the object store. The proxy server may be configured (e.g., with firewalls or other settings) to allow certain types of data to pass through and restrict or filter out other types of data. Thus, depending upon the configuration of the proxy server, the timestamp and header information may be filtered out and the object store may receive user requests with no time stamp or header information. The accurate routing of the user requests is, therefore, dependent upon the proxy server being properly configured. If the proxy server is not appropriately configured, the user requests may not be accurately conveyed to the object store. While changing the configuration of the proxy server may allow the user requests to pass through, these changes may allow unwanted data (e.g., viruses, spam, etc.) to pass through as well, which in turn may cause harm not just to the proxy server, but also impact the security of the object store. Thus, changing the configuration of the proxy server simply for allowing the timestamp and header information in the user requests to pass through may be undesirable. Accordingly, a technical problem currently exists of reliably routing user requests from the users to the object store without having to change the configuration of the proxy server significantly.

Further, without the timestamp or header information, the object store is left with no reliable mechanism of deciding which user request to accept and which user requests to reject. In such cases, the object store has to either randomly pick a user request or include additional hardware and software that help the object store decide. By randomly picking a user request to update the object store, the object store cannot ensure that only recent updates, and not stale updates, are accepted. Thus, the object store is not able to keep the object store properly updated. On the other hand, by using additional hardware or software that help the object store pick only recent updates, the complexity of the object store is greatly increased, which in turn increases the cost to develop, use, and maintain the object store. Thus, by not having a definite mechanism for identifying which user request to accept and which ones to reject, the object store cannot operate optimally. Accordingly, additional technical problems exist in which the object store lacks a mechanism for reliably accepting and rejecting user requests, as well keeping the object store up to date.

Therefore, an easier, reliable, and robust mechanism to resolve collision conditions is needed. Specifically, a mechanism to reliably route the user requests from the users to the object store is needed. Additionally, a reliable mechanism is needed for the object store to identify which user requests to accept and which ones to rejects when multiple user requests are received for updating a particular portion of the object store. The present disclosure provides such a solution. Specifically, the present disclosure provides a compare and swap ("CAS") value that is associated with each bucket and each object of the object store. This CAS value is called a current CAS value of that particular bucket or object. The current CAS value is updated each time an update is made to that particular bucket or object. When the object store receives multiple requests simultaneously to update a particular bucket or object, the object store compares an updated CAS value from each user request with the current CAS value to resolve the collision condition.

As discussed in greater detail below, the CAS value may be a simple integer value. Therefore, the CAS value is easily passed through the proxy server without requiring significant modifications to the configuration of the proxy server. The proxy server is able to reliably transmit the user requests from the users to the object store, while preventing unwanted data (e.g., viruses, spam, etc.) from passing through. Thus, the proxy server no longer has to compromise safety and security for reliability. As such, the operation of the proxy server is improved. Similarly, the operation of the object store is improved. Since the CAS value is not filtered out by the proxy server, the object store has a reliable mechanism by virtue of the CAS value to determine which user request to accept and which user requests to reject, and to keep the object store up to date, as discussed in greater detail below.

Referring now to FIG. 1, an example block diagram of an object store system 100 is shown, in accordance with some embodiments of the present disclosure. The object store system 100 includes an object store 105 that is configured to be accessed by a plurality of users 110 via an application programming interface ("API") 115. The object store 105, also known as an object-based storage system, may be used by one or more of the plurality of users 110 to store a variety of unstructured bytes of data such as data files, videos, images, music files, etc. The configuration of the object store 105 is described in greater detail in FIGS. 2 and 3 below.

The plurality of users 110 that access the object store 105 may be located anywhere in the world and may access the object store via their personal devices such as laptops, desktops, tablets, other handheld or portable devices, and/or other types of computing devices that are configured to access the API 115. Thus, each of the plurality of users 110 may be located in different geographical locations and still access the object store 105 by accessing the API 115. The API 115 is an interface that provides a set of routines, protocols, and tools to allow the plurality of users 110 to access the object store 105. In some embodiments, the API 115 is a representational state transfer ("REST") type of API. In other embodiments, the API 115 may be any other type of web API (e.g., ASP.NET) built using any of a variety of technologies, such as Java, .Net, etc. In embodiments in which the object store 105 is configured as a virtual object storage system, the API 115 may be of a type that is configured to access the virtual object storage system. Thus, the API 115 may be configured as any of a variety of types of APIs that are capable of accessing the object store 105 and routing requests between the plurality of users 110 and the object store.

In some embodiments, the API 115 may be configured to facilitate communication between the plurality of users 110 and the object store 105 via a hypertext transfer protocol ("HTTP") or hypertext transfer protocol secure ("HTTPS") type request. The API 115 may receive an HTTP/HTTPS request (generally referred to herein as a "user request") from a user device of the plurality of users 110 and send an HTTP/HTTPS response back to those plurality of users. In other embodiments, depending upon the type of the API 115, the API may be configured to facilitate communication with the plurality of users 110 using other or additional types of communication protocols. Further, the API 115 may be hosted on an API gateway 120, which may facilitate receiving user requests from multiple ones of the plurality of users 110. Thus, multiple ones of the plurality of users 110 may simultaneously access the object store 105 by sending user requests to the API 115 and the API gateway 120.

In some embodiments, the plurality of users 110 may make user requests by accessing a web browser using their personal computing devices. For example, a user desiring to access the object store 105 may open a browser on their personal computing device (e.g., laptop) and enter a uniform resource locator ("URL") for the API 115. The URL to access the API 115 may be known to the user. In some embodiments, the URL for the API 115 may be published by the provider of the object store 105 (e.g., the entity providing and maintaining the object store 105). In other embodiments, other mechanisms for making user requests may be used. The user request from the user's computing device may be transferred to the API 115 via a network 125. In some embodiments, the network 125 is the World Wide Web or the Internet. In other embodiments, the network 125 may include one or more of the cellular network, Wi-Fi, Wi-Max, ZigBee, Bluetooth, a proprietary network, Ethernet, Universal Serial Bus ("USB"), Thunderbolt, or any other type of wired or wireless network, or a combination thereof. The network 125 is structured to permit the exchange of data, instructions, messages, or other information between the plurality of users 110 and the API 115.

Upon receiving the user request(s) from the plurality of users 110, the API 115 and the API gateway 120 may transfer the request to the object store 105 via networks 130 and proxy server 135. In some embodiments, the API 115 and the API gateway 120 may convert the user request(s) into a form that may be more suitable for transmission to the object store 105. Thus, the API 115 and the API gateway 120 may receive a first user request from the plurality of users 110 and send a second user request to the object store 105 based upon the first user request. In some cases, the API 115 and the API gateway 120 may receive user request(s) from the plurality of users 110 and present information to and/or request information from the plurality of users before establishing communication with the object store 105. For example, the API 115 and the API gateway 120 may receive a user request to access the object store 105. In response, the API 115 may present one or more displays on the user device (from which the user request was received) to request and/or display information.

For example, in some embodiments, only authorized users of the plurality of users 110 may be allowed to access the object store 105. Thus, the plurality of users 110 may be required to obtain an API key to become authorized and be able to send user requests to the API 115 and access the object store 105. The API key may be provided and maintained by the object store provider. Thus, in some embodiments, when any of the plurality of users 110 attempt to access the object store 105 via the API 115, the API may first ask for the API key. For example, upon receiving a user request, the API 115 may present a display on the user device of the user sending the user request and prompt the user for the API key. The user may enter the API key within appropriate fields of the display. The API 115 may match the entered API key with the API key previously stored in a database for that user. If the entered API key matches with the previously stored API key, the API 115 may consider the user authenticated and authorized. The API 115 may then present additional displays on the user device to facilitate access to the object store 105. In other embodiments, other authentication mechanisms may be used to control access to the object store 105. In some embodiments, no authentication mechanism may be used and the object store 105 may be configured to be accessed by any user.

Thus, upon receiving user requests, in some embodiments, the API 115 and the API gateway 120 may communicate with the object store 105 to, for example, read data from the object store and/or write data to the object store. Likewise, the API 115 and the API gateway 120 may receive information from the object store 105 and transfer that information back to the plurality of users 110 via an HTTP/HTTPS response. In some embodiments, as indicated above, the communication between the API 115 and the API gateway 120, and the object store 105 may be facilitated by the proxy server 135 over the networks 130. The networks 130 may be similar to the network 125.

The proxy server 135 may be a computer system or application that facilitates communication between the API gateway 120 and the object store 105. Thus, the proxy server 135 acts an intermediary between the API 115 and the object store 105. In some embodiments, the API gateway 120 and the proxy server 135 may be combined together into a single component. The proxy server 135 receives requests from the API gateway 120 and routes those requests to the object store 105. The proxy server 135 also receives information from the object store 105 and routes that information to the API gateway 120. In other embodiments, other or additional mechanisms may be used to facilitate communication between the API gateway 120 and the object store 105. In some embodiments, the object store system 100 may be configured such that the API gateway 120 may directly communicate with the object store 105 without any intervening proxy server or other intermediary.

It is to be understood that the configuration of the API 115, the API gateway 120, the proxy server 135, and the communication between the plurality of users 110 and the API 115, as well as between the API and the object store 105 may take various forms. It is also to be understood that the features described above pertaining to the communication between the plurality of users 110, the API 115/API gateway 120, and the object store 105 is simply an example and is not intended to be limiting in any way. Further, it is to be understood that only some components of the object store system 100 are shown and described herein. Nevertheless, components that are considered desirable or necessary to perform the functions described herein are contemplated and considered within the scope of the present disclosure. Further, although only three of the plurality of users 110 are shown herein, the number of the plurality of users that may access the object store 105 may vary.

Figure 2:
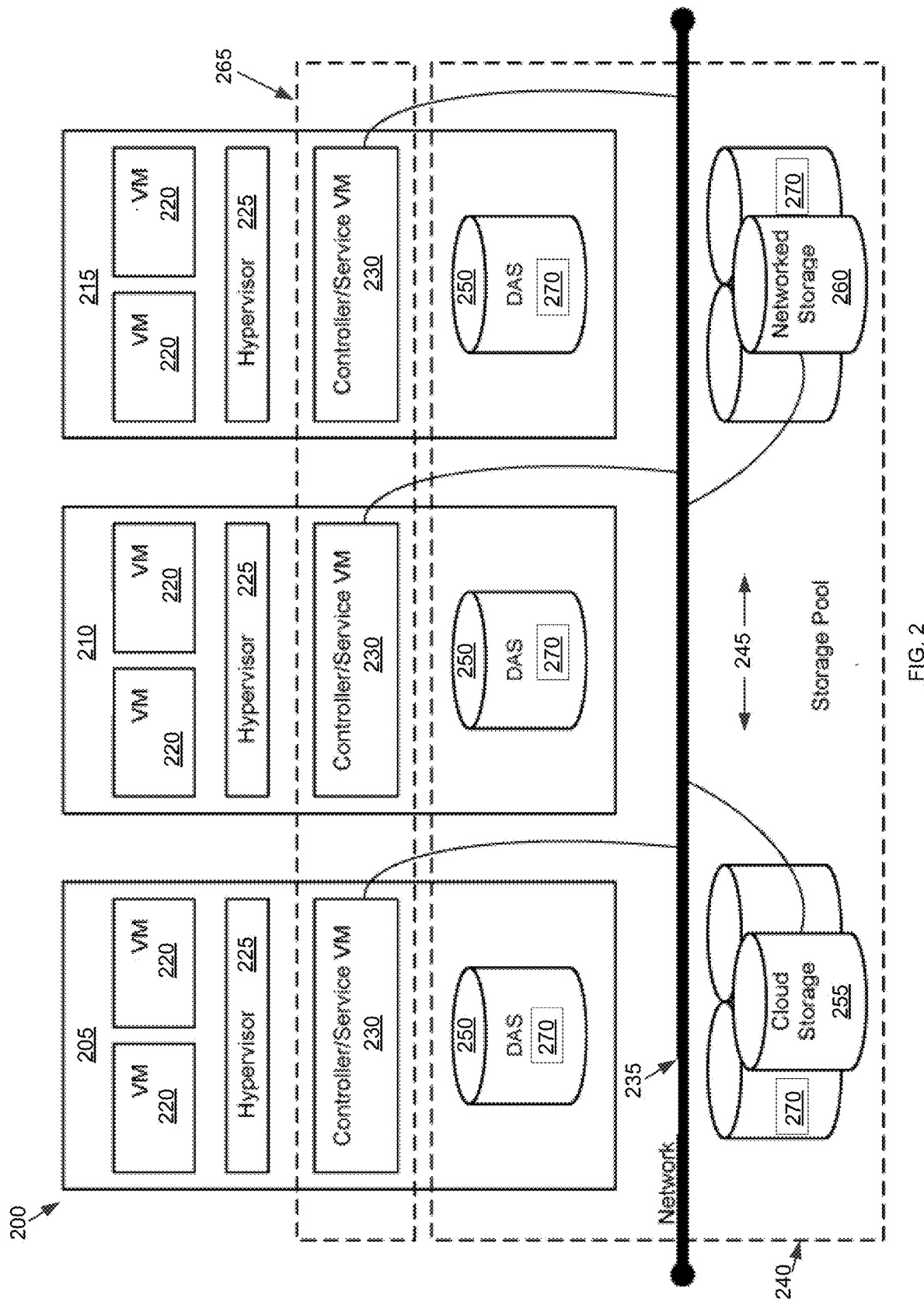
FIG. 2 is a block diagram of the object store of FIG. 1 configured as a virtual object storage system, in accordance with some embodiments of the present disclosure.

Turning now to FIG. 2, a virtual object storage system 200 is shown, in accordance with some embodiments of the present disclosure. The object store 105 of FIG. 1 may be structured in some embodiments as the virtual object storage system 200. The virtual object storage system 200 includes a plurality of nodes, such as a first node 205, a second node 210, and a third node 215. Each of the first node 205, the second node 210, and the third node 215 includes object store virtual machines (VMs) 220 and a hypervisor 225 configured to create and run the object store VMs. Each of the first node 205, the second node 210, and the third node 215 also includes a controller/service VM 230 that is configured to manage, route, and otherwise handle workflow requests to and from the object store VMs 220 of a particular node. The controller/service VM 230 is connected to a network 235 to facilitate communication between the first node 205, the second node 210, and the third node 215. Although not shown, in some embodiments, the hypervisor 225 may also be connected to the network 235.

The virtual object storage system 200 also includes a storage pool 240. The storage pool 240 may include network-attached storage 245 and direct-attached storage 250. The network-attached storage 245 is accessible via the network 235 and, in some embodiments, may include cloud storage 255, as well as local storage area network 260. In contrast to the network-attached storage 245, which is accessible via the network 235, the direct-attached storage 250 may include storage components that are provided within each of the first node 205, the second node 210, and the third node 215, such that each of the first, second, and third nodes may access its respective direct-attached storage without having to access the network 235. Thus, the network-attached storage 245 and/or the direct-attached storage 250 may include non-transient data storage mediums (e.g., local disc or flash-based hard drives, local network servers, and the like) and/or remote data storage facilities (e.g., cloud servers) for retrievably storing a variety of information.

Further, virtual disks ("vDisks") may be structured from the storage resources in the network-attached storage 245 and/or the direct-attached storage 250. As used herein, the term "vDisk" refers to the virtualized storage abstraction that is exposed by the controller/service VM 230 for use by the object store VMs 220. In some embodiments, the vDisk(s) may be mounted on the object store VMs 220 and an interface to the vDisk(s) may be exposed via a protocol such as iSCSI ("internet small computer system interface"), NFS ("network file system"), or any other appropriate protocol. These storage disks may be implemented by software running inside the controller/service VM 230. Thus, to the object store VMs 220, the controller/service VM 230 appears to be exporting a clustered storage appliance that contains storage disks.

It is to be understood that only certain components of the virtual object storage system 200 are shown in FIG. 1. Nevertheless, several other components that are commonly provided or desired in a virtual computing system used for object-based storage systems are contemplated and considered within the scope of the present disclosure. Similarly, although three of the plurality of nodes (e.g., the first node 205, the second node 210, and the third node 215) are shown in the virtual object storage system 200, in other embodiments, greater than or fewer than three nodes may be used. Likewise, although only two of the object store VMs 220 are shown on each of the first node 205, the second node 210, and the third node 215, in other embodiments, the number of the object store VMs on the first, second, and third nodes may vary to include either a single object store VM or more than two object store VMs. Further, the first node 205, the second node 210, and the third node 215 need not always have the same number of the object store VMs 220. Additionally, more than a single instance of the hypervisor 225 and/or the controller/service VM 230 may be provided on the first node 205, the second node 210, and/or the third node 215. In some embodiments, the hypervisor 225 may be optional.

In some embodiments, each of the first node 205, the second node 210, and the third node 215 may be a hardware device, such as a server. For example, in some embodiments, one or more of the first node 205, the second node 210, and the third node 215 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 205, the second node 210, or the third node 215 may be another type of device that is suitable for use as a node within the virtual object storage system 200. In some embodiments, the virtual object storage system 200 may be part of a data center.

Each of the first node 205, the second node 210, and the third node 215 may also be configured to communicate and share resources with each other via the network 235. For example, in some embodiments, the first node 205, the second node 210, and the third node 215 may communicate and share resources with each other via the controller/service VM 230 and/or the hypervisor 225. One or more of the first node 205, the second node 210, and the third node 215 may also be organized in a variety of network topologies, and each of the first node, the second node, and the third node may be termed as a "host" or "host machine."

Also, although not shown, one or more of the first node 205, the second node 210, and the third node 215 may include one or more processing units configured to execute instructions. The instructions may be carried out by a special purpose computer, logic circuits, or hardware circuits of the first node 205, the second node 210, and the third node 215. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 240, as well as with other elements of the respective first node 205, the second node 210, and the third node 215 to receive, send, and process information, and to control the operations of the underlying first, second, or third node. The processing units may retrieve a set of instructions from the storage pool 140, such as, from a permanent memory device like a read only memory (ROM) device and copy the instructions in an executable form to a temporary memory device that is generally some form of random access memory (RAM). The ROM and RAM may both be part of the storage pool 240, or in some embodiments, may be separately provisioned from the storage pool. Further, the processing units may include a single stand-alone processing unit, or a plurality of processing units that use the same or different processing technology.

With respect to the storage pool 240 and particularly with respect to the direct-attached storage 250, it may include a variety of types of memory devices. For example, in some embodiments, the direct-attached storage 250 may include, but is not limited to, any type of RAM, ROM, flash memory, magnetic storage devices (e.g., hard disk, floppy disk, magnetic strips, etc.), optical disks (e.g., compact disk (CD), digital versatile disk (DVD), etc.), smart cards, solid state devices, etc. Likewise, the network-attached storage 245 may include any of a variety of network accessible storage (e.g., the cloud storage 255, the local storage area network 260, etc.) that is suitable for use within the virtual object storage system 200 for storing the object store 105 and accessible via the network 235. The storage pool 240 including the network-attached storage 245 and the direct-attached storage 250 may together form a distributed storage system 265 configured to be accessed by each of the first node 205, the second node 210, and the third node 215 via the network 235 and the controller/service VM 230, and/or the hypervisor 225. Further, the network-attached storage 245 and/or the direct-attached storage 250 may be expandable, such that additional storage capacity may be added to the storage pool 240 when desired. Also, as noted above, in some embodiments, the various storage components in the storage pool 240 may be configured as virtual disks for access by the object store VMs 220.

An object store 270 may be stored within the network-attached storage 245 and/or the direct-attached storage 250. In some embodiments, all user data that is stored in the object store 270 may reside on the vDisks discussed above. In some embodiments, the object store 270 may be stored in its entirety of a single storage component (e.g., a specific storage component of the network-attached storage 245 and/or the direct-attached storage 250). In other embodiments, portions of the object store 270 may be stored on multiple storage components. In addition to storing the actual data within the object store 270, the network-attached storage 245 and/or the direct-attached storage 250 may also store other types of information related to the object store. For example, in some embodiments, the network-attached storage 245 and/or the direct-attached storage 250 may also store metadata related to the data stored within the object store. Likewise, the network-attached storage 245 and/or the direct-attached storage 250 may also store current CAS values, discussed in greater detail below, associated with each element of the object store 270. The network-attached storage 245 and/or the direct-attached storage 250 may, thus, store a variety of information pertaining to accessing and managing the object store 270.

Further, the object store 270 may be accessed by the object store VMs 220. Each of the object store VMs 220 is a software-based implementation of a computing machine in the virtual object storage system 200. The object store VMs 220 emulate the functionality of a physical computer. Specifically, the hardware resources, such as processing unit, memory, storage, etc., of the underlying computer (e.g., the first node 205, the second node 210, and the third node 215) are virtualized or transformed by the hypervisor 225 into the underlying support for each of the object store VMs 220 that may run its own operating system and applications on the underlying physical resources just like a real computer. By encapsulating an entire machine, including CPU, memory, operating system, storage devices, and network devices, the object store VMs 220 are compatible with most standard operating systems (e.g. Windows, Linux, etc.), applications, and device drivers.

Each of the object store VMs 220 may be configured to provide infrastructure capability (in contrast to end user capability) and run software to provide object store functionality for accessing and managing the object store 270. For example, each of the object store VMs 220 may be configured to receive requests from users (e.g., from the plurality of users 110 via the API 115) for reading data from and/or writing data to the object store 105. Each of the object store VMs 220 may further be configured to determine how/where to store data in the object store 270, how to distribute load, handle compression of data, perform load balancing, access control, data sharding/placement, etc. Thus, each of the object store VMs 220 may be configured to perform a variety of functions that are related to creating and managing the object store 270.

Each of the object store VMs 220 may in turn be managed by the hypervisor 225. The hypervisor 225 is a virtual machine monitor that allows a single physical server computer (e.g., the first node 205, the second node 210, third node 215) to run multiple instances of the object store VMs 220, with each object store VM sharing the resources of that one physical server computer, potentially across multiple environments. By running the plurality of object store VMs 220 on each of the first node 205, the second node 210, and the third node 215, multiple workloads and multiple operating systems may be run on a single piece of underlying hardware computer (e.g., the first node, the second node, and the third node) to increase resource utilization and manage workflow.

The object store VMs 220 are also controlled and managed by the controller/service VM 230. The controller/service VM 230 of each of the first node 205, the second node 210, and the third node 215 is configured to communicate with each other via the network 235 to form a distributed system 165. The hypervisor 225 of each of the first node 205, the second node 210, and the third node 215 may be configured to run virtualization software, such as, ESXi from VMWare, AHV from Nutanix, Inc., XenServer from Citrix Systems, Inc., etc., for running the object store VMs 220 and for managing the interactions between the object store VMs and the underlying hardware of the first node 205, the second node 210, and the third node 215. The controller/service VM 230 and the hypervisor 225 may be configured as suitable for use within the virtual object storage system 200.

The network 235 may include any of a variety of wired or wireless network channels that may be suitable for use within the virtual object storage system 200. For example, in some embodiments, the network 235 may include wired connections, such as an Ethernet connection, one or more twisted pair wires, coaxial cables, fiber optic cables, etc. In other embodiments, the network 235 may include wireless connections, such as microwaves, infrared waves, radio waves, spread spectrum technologies, satellites, etc. The network 235 may also be configured to communicate with another device using cellular networks, local area networks, wide area networks, the Internet, etc. In some embodiments, the network 235 may include a combination of wired and wireless communications.

Referring still to FIG. 2, in some embodiments, one of the first node 205, the second node 210, or the third node 215 may be configured as a leader node. The leader node may be configured to monitor and handle requests from other nodes in the virtual object storage system m 200. In some embodiments, the user requests for accessing the object store 270 may also be received by the leader node and the leader node may then direct the user requests to other nodes for fulfillment. The leader node may also receive information back from the object store 270 and direct that information back to the users. For example, in some embodiments, one of the object store VMs 220 of the leader node may be designated to receive the user requests via the API 115 and the API gateway 120. If multiple user requests are received, as discussed in greater detail below, the one of the object store VMs 220 of the leader node that receives the user requests may decide which user request to accept and which user requests to reject. Upon deciding which user request to accept, that object store VM 220 may transfer that user request to the controller/service VM 230 of the leader node. Thus, the object store VMs 220 of the leader node that receives the user requests may be considered a front-end service and the controller/service VM 230 of the leader node may be considered a back-end service.

In some embodiments, the object store VM 220 may convert the user requests in a form (e.g., an iSCSI format, NFS format, etc.) that is more suitable for the controller/service VM 230 before transferring the user request to the controller/service VM. The controller/service VM 230 may then either access the object store 270 to read and/or update the object store as indicated in the user request, or transfer the request to other nodes in the virtual object storage system 200 for fulfilling (e.g., reading data from or writing data to the object store) the user request. The controller/service VM 230 of the leader node may also receive an indication from the other nodes when the user request has been fulfilled. Upon fulfillment of the user request, the controller/service VM 230 of the leader node may send a response back to the object store VM 220 of the leader node that initially received the user request (although in some embodiments, the controller/service VM may send the response to another one of the object store VM on the leader node). The response may include the data that is read from the object store or a notification that the object store has been updated as indicated in the user request. The object store VM 220 may then forward the response back to the API 115 and the API gateway 120. In some embodiments, the controller/service VM 230 may simply send an indication to the object store VM 220 of the leader node that the user request has been fulfilled (along with the data that was read, if any) and the object store VM may prepare the response (e.g., notification) to be sent to the API 115 and the API gateway 120. In some embodiments, the controller/service VM 230 of the leader node may be configured to receive the user requests directly from the API 115 and the API gateway 120. If the leader node fails, another leader node may be designated.

Furthermore, one or more of the first node 205, the second node 210, and the third node 215 may be combined together to form a network cluster (also referred to herein as simply "cluster.") Generally speaking, all of the nodes (e.g., the first node 205, the second node 210, and the third node 215) in the virtual object storage system 200 may be divided into one or more clusters. One or more components of the storage pool 140 may be part of the cluster as well. For example, the virtual object storage system 200 as shown in FIG. 1 may form one cluster in some embodiments. Multiple clusters may exist within a given virtual computing system (e.g., the virtual object storage system 200). The object store VMs 220 that are part of a cluster may be configured to share resources with each other. In some embodiments, multiple clusters may share resources with one another.

Figure 3:
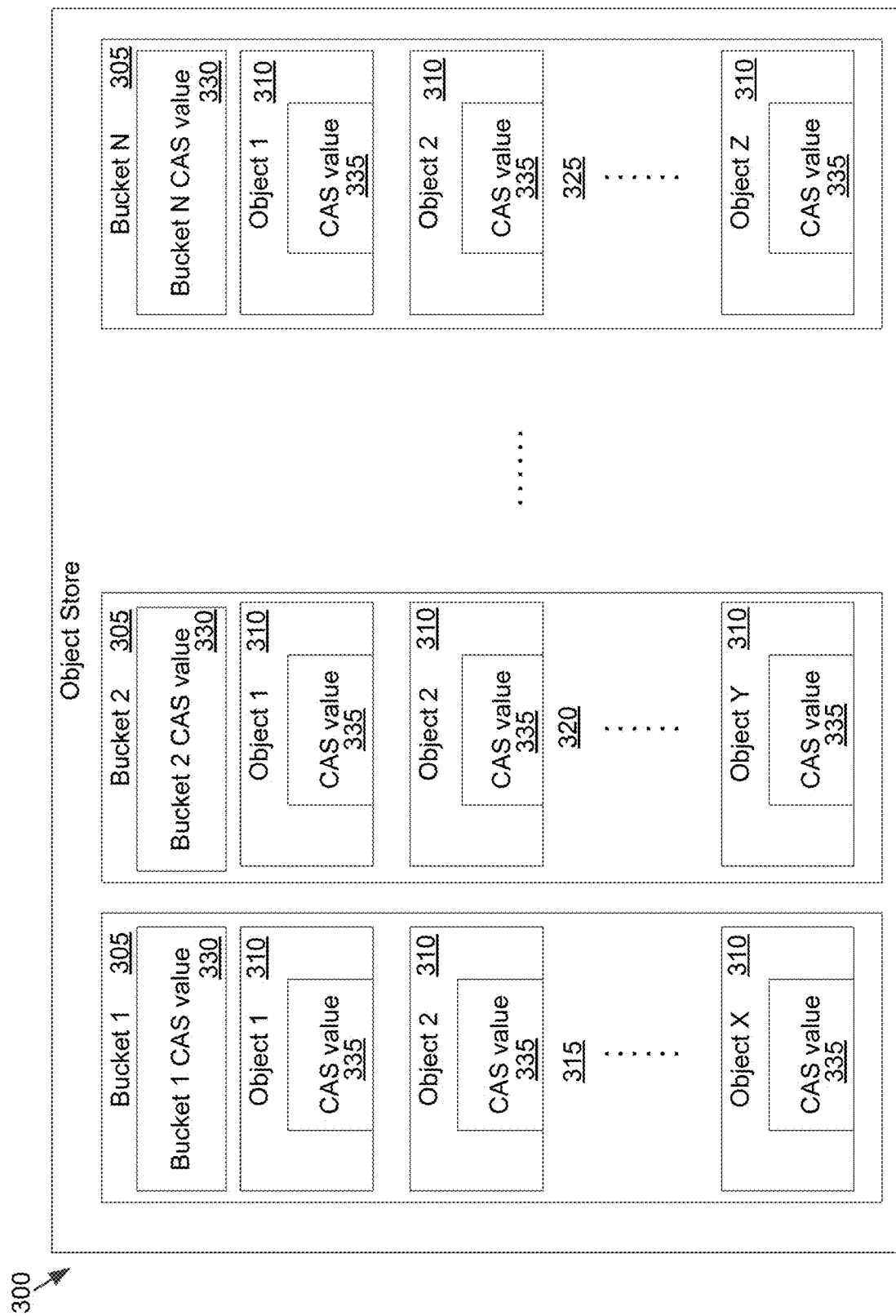
FIG. 3 is another block diagram of the object store of FIG. 1, in accordance with some embodiments of the present disclosure.

Referring now to FIG. 3, a block diagram of an object store 300 is shown, in accordance with some embodiments of the present disclosure. The object store 300 is analogous to the object store 270 of FIG. 2. The object store 300 is configured with a plurality of buckets 305 and each of the plurality of buckets includes one or more objects 310. Each of the plurality of buckets 305 may be stored within the network-attached storage 245 and/or the direct-attached storage 250 described above with respect to FIG. 2. The location of where a particular one of the plurality of buckets 305 is stored within the virtual object storage system 200 is known to the object store VMs 220 configured to access that particular location.

Further, each of the plurality of buckets 305 may be configured to store a specific type of data. For example, in some embodiments, a first bucket 315 may be configured to store image files, a second bucket 320 may be configured to store video files, a third bucket 325 may be configured to store data files, and so on. In some embodiments, multiple buckets may be configured to store the same type of data (e.g., image files, data files, etc.). Each of the plurality of buckets 305 may also be configured with certain attributes. For example, each of the plurality of buckets 305 includes a name that uniquely identifies a bucket and distinguishes that bucket from other buckets within the object store 300. Each of the plurality of buckets 305 also includes a bucket CAS value 330 that is used for resolving collision conditions when multiple simultaneously requests to update the plurality of buckets are received. The bucket CAS value 330 is an integer number that is assigned to each bucket when that bucket is created. In some embodiments, one or more of the plurality of buckets 305 may be initialized (e.g., by the virtual object storage system 200) upon creation with the bucket CAS value 330 of 1. In other embodiments, one or more of the plurality of buckets 305 may be initialized upon creation with the bucket CAS value 330 other than 1. The bucket CAS value 330 of each of the plurality of buckets 305 is updated (e.g., incremented) each time an update is made to that particular bucket.

Referring still to FIG. 3, each of the plurality of buckets 305 stores one or more of the objects 310 therein. An "object" may be considered analogous to one "file." For example, one image file may be considered one object. Likewise, one video file may be considered one object, and so on. Further, the one or more objects 310 that are stored within a particular one of the plurality of buckets 305 correspond to the type of data that the particular bucket is configured to store. For example, the one or more objects 310 that are stored within a bucket configured to store images are also all images. Further and similar to the plurality of buckets 305, each of the one or more objects 310 may have one or more attributes associated therewith. For example, in some embodiments, each of the one or more objects 310 may include an object name that uniquely identifies that object and distinguishes that object from other objects with that bucket. Each of the one or more objects 310 may also include metadata associated therewith, as well as an object CAS value 335. The object CAS value 335 is similar to the bucket CAS value 330. Specifically and like the bucket CAS value 330, the object CAS value 335 is an integer number that is incremented each time an update is made to the object associated therewith. Also like the bucket CAS value 330, the object CAS value 335 is used to avoid collision conditions when multiple users are attempting to update a particular one or more of the one or more objects 310.

It is to be understood that although each of the plurality of buckets 305 and each of the objects 310 have been described in the present disclosure as having a CAS value (e.g., the bucket CAS value 330 and the object CAS value 335), in other embodiments, at least some buckets and/or at least some objects may not have CAS values associated therewith. For example, in some embodiments, only bucket CAS values (e.g., the bucket CAS value 330) may be assigned to one or more of the plurality of buckets 305. In other embodiments, only object CAS values (e.g., the object CAS value 335) may be assigned to one or more of the one or more objects 310. In yet other embodiments, a portion of the plurality of buckets 305 may have the bucket CAS value 330 associated therewith and the remaining portion of the plurality of buckets may not have bucket CAS values.

Likewise, in some embodiments, only certain ones of the one or more objects 310 may have the object CAS value 335, while other ones of the objects may not have the object CAS values. In some embodiments, the object CAS value 335 may be configured such that either all of the one or more objects 310 in a particular bucket have an object CAS value associated therewith or none of the objects in that particular bucket have an object CAS value. In other embodiments, the one or more objects 310 may be configured such that a portion of the objects within a particular one of the plurality of buckets 305 have the object CAS value 335, while the remaining portion of the objects within that particular bucket have no object CAS value. Thus, a variety of configurations for the bucket CAS value 330 and the object CAS value 335 are contemplated and considered within the scope of the present disclosure.

Further, although both the bucket CAS value 330 and the object CAS value 335 have been described as being integer numbers, in other embodiments, either or both of the bucket CAS value and the object CAS value may assume other configurations. For example, in some embodiments, either or both of the bucket CAS value 330 and the object CAS value 335 may be non-integer numbers, alphabets, alphanumeric, symbols, or other numeric, non-numeric, and/or pictorial values. Additional, the bucket CAS value 330 and the object CAS value 335 need not have the same type of representation. For example, in some embodiments, the bucket CAS value 330 may be integer values and the object CAS value 335 may be alphanumeric values. In some embodiments, a different representation of CAS value may be used depending upon the upon the type of data. For example, the plurality of buckets 305 and the one or more objects 310 configured to store images may be assigned integer CAS values and the plurality of buckets and the one or more objects storing video files may be assigned non-integer CAS values, and so on. Thus, the bucket CAS value 330 and the object CAS value 335 may each be configured in a variety of ways.

It is to be understood that the examples provided above are simply for illustration and are not intended to be limiting in any way.

By virtue of using the bucket CAS value 330 and the object CAS value 335, updates to the plurality of buckets 305 and the objects 310, respectively, may be made in a predictable manner. Specifically, at least some of the plurality of buckets 305 and the objects 310 therein may be structured to be accessed by multiple users. In certain instances, multiple users may be attempting to update (e.g., write to or modify) a particular one of the plurality of buckets 305 and/or a particular one or more of the one or more objects 310 therein simultaneously, resulting in a collision condition. When a collision condition occurs, updates requested by one user are accepted and the updates requested by the other users are rejected. The bucket CAS value 330 and the object CAS value 335 provide a reliable and predictable mechanism for determining which user's updates are accepted and which users' updates are rejected.

Figure 4:
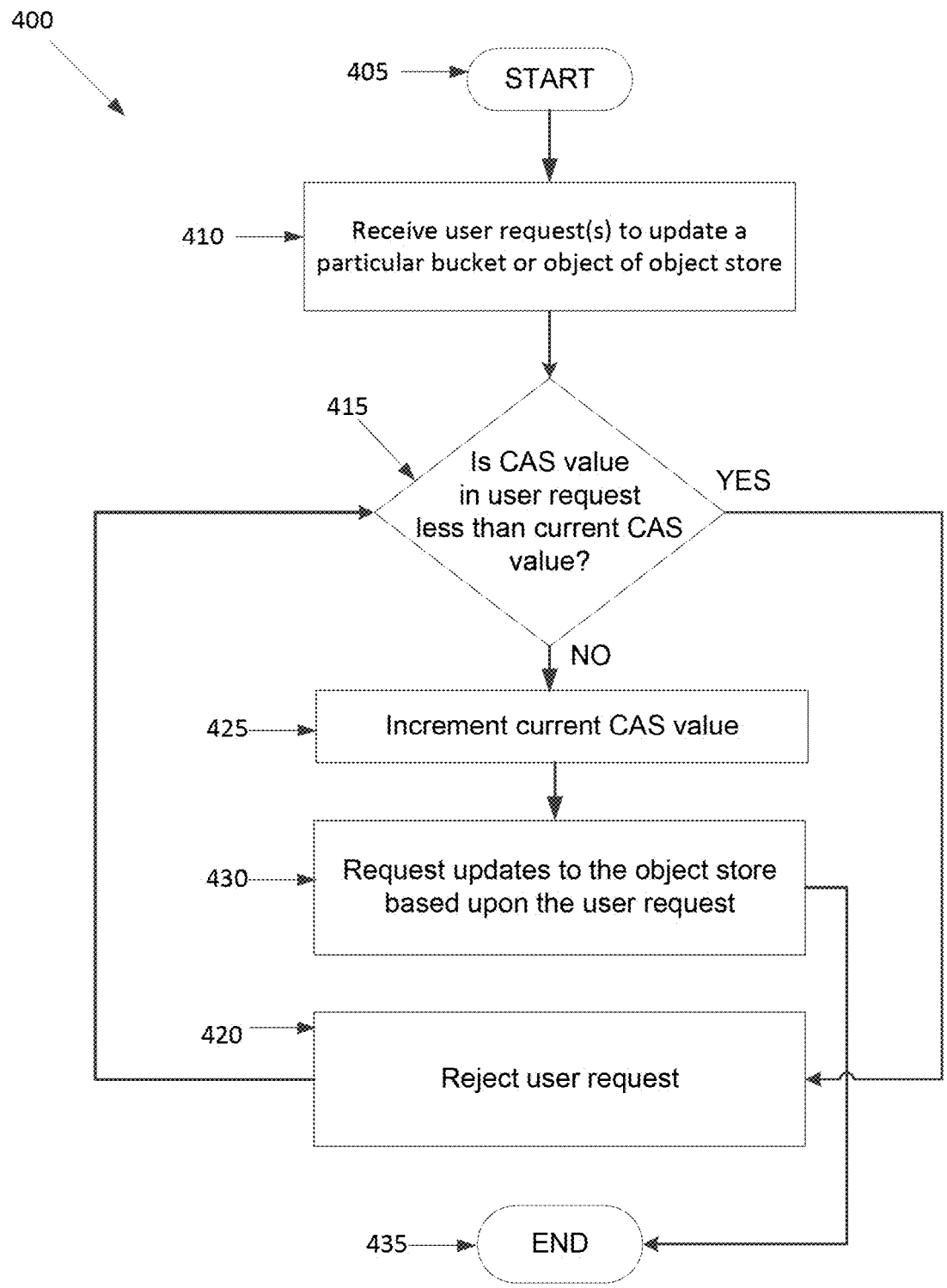
FIG. 4 is an example flowchart outlining operations for updating elements within the object store of FIG. 1, in accordance with some embodiments of the present disclosure.

Turning now to FIG. 4, a flowchart outlining a process 400 for updating an object store (e.g., the object store 300) is shown, in accordance with some embodiments of the present disclosure. The process 400 may include additional, fewer, or different operations, depending on the particular embodiment. The process 400 may be used for updating (e.g., writing or modifying) an element of the object store. The element to be updated may be a particular bucket (e.g., the plurality of buckets 305) or one or more objects (e.g., the one or more objects 310) within a particular bucket of the object store. To update the element, that element is first retrieved from the object store. Thus, after starting at operation 405, the virtual object storage system 200 receives one or more user requests at operation 410 for retrieving an element desired to be updated.

To retrieve the element desired to be updated from the object store, the user sends a user request to the object store via an API (e.g., the API 115). As discussed above, the user may send an HTTP/HTTPS request to the access the object store via the API. For example, in some embodiments, the user may send a GET or HEAD request, via the API, to retrieve the desired object from the object store. In those embodiments in which the object store is configured as the virtual object storage system (e.g., the virtual object storage system 200), the API transfers all of the user requests to a particular one of the object store VMs (e.g., the object store VMs 220). In some embodiments, the object store VM receiving the user requests is an object store VM on the leader node that has been designated to receive the user requests. In other embodiments, another object store VM (which is not on the leader node) may be designated to receive all user requests for accessing the object store.

Upon receiving the user request for retrieving the element from the object store (e.g., the object store 300) the object store VM (e.g., the object store VMs 220) retrieves the requested element (or transfers the user request to another component, which may then retrieve the requested element) and returns the retrieved element back to the user via the API (e.g., the API 115). In addition to returning the element to the user, the object store VM also returns the CAS value (e.g., the current CAS value associated with the element at the time of retrieving the element) to the user. Upon receiving the element, the user may update/modify the element as desired. In some embodiments, instead of updating/modifying the element, the user may simply provide a new version of that element. Once the user has completed modifying/updating the element (or has a new version of the element), the user issues another user request to the object store (e.g., the object store 300) for storing the updated element into the object store. The user may send the user request via the API (e.g., the API 115). For example, the user may issue a PUT command and provide the updated element and the CAS value received from the object store VM (e.g., the object store VMs 220) as an argument. The object store VM (e.g., the object store VMs 220) receives the user request along with the CAS value for updating the element.

It is to be understood that the object store VM (e.g., the object store VMs 220) may receive multiple user requests to update a particular element of the object store (e.g., the object store 300). In response to each of those user requests, the object store VM may retrieve and return the element to each of the users, as explained above with respect to the operation 410. The object store VM also returns the CAS value with the element in each of the user requests.

For each user request that is received at the operation 410, the object store VM updates the CAS value included in that user request at operation 415. As indicated above, the CAS value is the bucket CAS value 330 or the object CAS value 335 that is associated with each element (e.g., the plurality of buckets 305 and the one or more objects 310) within the object store (e.g., the object store 300). The CAS value is updated (e.g., incremented) each time the associated element is updated. In some embodiments, the CAS value is incremented by one each time an update is made to the associated element. In other embodiments, the CAS value may be incremented by increments other than one. Further, the CAS value of each of the elements in the object store (e.g., the object store 300) need not be incremented by the same increment. For example, in some embodiments, the CAS value of all buckets (or a portion of the buckets) may be incremented by a first increment and the CAS value of all the objects (or a portion of the objects) may be incremented by a second increment. Thus, the increments in which the CAS value is incremented may vary from one embodiment to another.

Further, in some embodiments, the CAS value need not be incremented to be updated. Rather, in some embodiments, the CAS value may be decremented. For example, the CAS value may be initialized with a particular number (e.g., a high number) and decremented each time an update is made to the associated bucket or object. Thus, what constitutes an "update" to the CAS value may also vary from one embodiment to another.

In addition to updating (e.g., incrementing) the CAS value to an incremented or updated CAS value at the operation 415, the object store VM (e.g., the object store VMs 220) attempts to update the element in the object store (e.g., the object store 300). As part of updating the element, for each user request, the object store VM compares the incremented CAS value to the current CAS value of the element being updated at the operation 415. If the object store VM determines that the incremented CAS value is equal to or less than the current CAS value (e.g., the CAS value associated with the element at the time of comparison) of the element being updated, the object store VM infers that the element has been updated previously and that the data already in the element is more recent than the data in the requested update. Thus, if the object store VM determines that the incremented CAS value, from the operation, 415 is equal to or less than the current CAS value, the object store VM may infer that the updates requested by the user request are stale updates and reject the user request at operation 420. The object store VM may reject the requested updates by sending a notification (e.g., message) of rejection to those user devices (via the API 115) from which those user requests were made.

In addition, when the update is rejected, the object store VM does not update the current CAS value of that element with the incremented CAS value. The process 400 ends at operation 435 if a single user request was received at the operation 410 or the process loops back to the operation 415 for analyzing the next user request when multiple user requests are received for updating/modifying the element.

On the other hand, if at the operation 415, the object store VM (e.g., the object store VMs 220) determines that the incremented CAS value is greater than the current CAS value of the element being updated, the object store VM updates the element at operation 430. To make the requested updates to the element, the object store VM transfers the user request to the controller/service VM (e.g., the controller/service VM 230) of the leader node (or another node in some embodiments). The controller/service VM (or possibly the object store VM that sent the user request) may then determine the location of the element within the virtual object storage system (e.g., the virtual object storage system 200). The controller/service VM may either make the requested updates itself or transfer the request to other components (e.g., another object store VM) within the virtual object storage system for making the updates. The actual manner in which the user request is handled by the leader node (or another node) may vary from one embodiment to another.

In addition to sending the user request to the controller/service VM (e.g., the controller/service VM 230) for updating the object store (e.g., the object store 300), the object store VM also updates (e.g., increments), at the operation 425, the current CAS value of the element being updated by replacing the current CAS value of that element with the incremented CAS value from the operation 410. When the updates to the element of the object store have been made (e.g., the updated element and metadata associated with the updated element have been stored), the object store VM receives an indication back from the controller/service VM and sends a response back to the user (e.g., via the API 115). In addition to updating the element and the current CAS value, the object store VM may also notify the user of the updated element.

If the object store VM (e.g., the object store VMs 220) has received multiple user requests to update the element, in some embodiments, after the object store VM has updated the element at the operation 430, the object store VM may reject all of the other user requests for updating that element and the process 400 ends at the operation 435. In other embodiments, the object store VM may continue analyzing the remaining user requests and comparing the incremented CAS value of each of those user requests with the updated value of the current CAS value. Further, the order in which the object store VM (e.g., the object store VMs 220) analyzes the user requests may vary from one embodiment to another. In some embodiments, the object store VM may analyze the user requests in the order in which the object store VM has received those requests. In other embodiments, other criteria may be used to scan the user requests. In some embodiments, the object store VM may analyze all of the user requests in parallel at the same time by incrementing the current CAS value in each user request and comparing the incremented CAS value in each user request with the current CAS value of the element being updated in parallel. The object store VM may then use another criteria to decide which of those user requests having the incremented CAS value greater than the current CAS value to accept for updating the object store.

Again, by comparing the incremented CAS value with the current CAS value, the object store VM determines whether the particular element has been updated since the requested updates in the user request. For example, if the user request CAS value is less than or equal to the current CAS value, then the object store VM may determine that the particular element has been updated previously and that the updates requested in the user request are stale (or possibly not needed any more). By updating an element when the incremented CAS value is greater than the current CAS value, the object store VM ensures that the particular element is receiving the most recent updates and is kept up to date.

Further, the manner in which the updates are made may vary from one embodiment to another based upon the configuration of the object store. For example, in some embodiments, the object store may be enabled for versioning. In such cases, a new version of the element may be created each time an update is made to that element. By virtue of using versioning, previous data of the element is not overwritten. Further, in some embodiments in which versioning are used, the current version number of the element may be used as the current CAS value. Thus, in such cases, if the user request CAS value is equal to or greater than the current version of the element, then that user request is accepted. In other embodiments and particularly if versioning is disabled, updating of the element may overwrite the previous data.

Thus, the present disclosure provides a predictable and reliable mechanism to manage multiple user requests when updating the object store. The CAS values are not filtered out by the proxy server and do not require significant modification to the configuration of the proxy server. Further, the CAS values provide a reliable mechanism to the object store for identifying which user request to accept and which ones to reject. Thus, the present disclosure improves the operation of the proxy server, operation of the object store, and ensures that the object store is kept up to date with relevant updates.

It is also to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving, by an object store virtual machine, multiple user requests for updating an element of an object store, each of the multiple user requests comprising a compare and swap value;
   updating, by the object store virtual machine, each compare and swap value to obtain an updated compare and swap value for each compare and swap value;

comparing, by the object store virtual machine, each of the updated compare and swap value with a current compare and swap value;

accepting, by the object store virtual machine, one of the multiple user requests for updating the element and rejecting other ones of the multiple user requests based upon the comparison; and when the updated compare and swap value is greater than the current compare and swap value: updating, by the object store virtual machine, the element; and replacing, by the object store virtual machine, the current compare and swap value with the updated compare and swap value.

2. The method of claim 1, further comprising incrementing, by the object store virtual machine, the first compare and swap value to obtain the updated compare and swap value.

3. The method of claim 1, further comprising returning, by the object store virtual machine, a copy of the element to be updated and the first compare and swap value in response to a user that sent the user request.

4. The method of claim 2, wherein the first compare and swap value is incremented by one.

5. The method of claim 3, wherein the first compare and swap value is the current compare and swap value associated with the element at the time of the returning of the copy.

6. The method of claim 1, further comprising associating, by the object store virtual machine, an instance of the current compare and swap value with each bucket and each object of the object store.

7. The method of claim 1, further comprising updating, by the object store virtual machine, the element upon determining that the updated compare and swap value greater than the current compare and swap value.

8. The method of claim 1, wherein the first compare and swap value, the updated compare and swap value, and the current compare and swap value are all integer numbers.

9. The method of claim 1, wherein updating the element comprises creating a new version of the element or overwriting a previous version of the element.

10. A system comprising:
a virtual object storage system for managing an object store comprising:
a database configured to store the object store; and
an object store virtual machine having a processing unit that:
receives multiple user requests for updating an element of the object store, each of the multiple user requests comprising a compare and swap value;
updates each compare and swap value to obtain an updated compare and swap value for each compare and swap value;
compare each of the updated compare and swap value with the current compare and swap value;
accept one of the multiple user requests for updating the element and rejecting other ones of the multiple user requests based upon the comparison; and when the updated compare and swap value is greater than the current compare and swap value, update the element and replace the current compare and swap value with the updated compare and swap value.

11. The system of claim 10, wherein the object store comprises a plurality of buckets and each of the plurality of buckets comprises one or more objects, and wherein an instance of the current compare and swap value is associated with each of the plurality of buckets and each of the one or more objects of each of the plurality of buckets.

12. The system of claim 10, wherein the first compare and swap value, the updated compare and swap value, and the current compare and swap value are integer numbers.

13. The system of claim 10, wherein the processing unit further increments the first compare and swap value to obtain the updated compare and swap value.

14. The system of claim 10, wherein the processing unit further updates the element upon determining that the updated compare and swap value is greater than the current compare and swap value.

15. The system of claim 10, wherein the processing unit further updates the element by creating a new version of the element or overwriting a previous version of the element.

16. A non-transitory computer readable media with computer-executable instructions embodied thereon that, when executed by a processor of an object store virtual machine of a virtual object storage system, cause the object store virtual machine to perform a process comprising:
receiving multiple user requests for updating an element of an object store, each of the multiple user requests comprising a compare and swap value;
updating each compare and swap value to obtain an updated compare and swap value for each compare and swap value;
comparing each of the updated compare and swap value with the current compare and swap value;
accepting one of the multiple user requests for updating the element and rejecting other ones of the multiple user requests based upon the comparison;
when the updated compare and swap value is greater than the current compare and swap value, updating the element; and replacing the current compare and swap value with the updated compare and swap value.

17. The non-transitory computer readable media of claim 16, wherein updating the first compare and swap value comprises incrementing the first compare and swap value by one.

18. The non-transitory computer readable media of claim 16, wherein the first compare and swap value, the updated compare and swap value, and the current compare and swap value are integer numbers.

19. The non-transitory computer readable media of claim 16, further comprising updating the element upon determining that the updated compare and swap value is greater than the current swap and compare value.

* * * * *